United States Patent

[11] 3,580,243

| [72] | Inventor | Gilbert A. Johnson<br>Milwaukee, Wis. |
|---|---|---|
| [21] | Appl. No. | 769,314 |
| [22] | Filed | Oct. 21, 1968 |
| [45] | Patented | May 25, 1971 |
| [73] | Assignee | Marquette Electronics, Inc.<br>Milwaukee, Wis. |

[54] MEANS AND METHOD FOR SUBTRACTING DC NOISE FROM ELECTROCARDIOGRAPHIC SIGNALS
6 Claims, 1 Drawing Fig.

| [52] | U.S. Cl. | 128/2.06B,<br>328/151 |
|---|---|---|
| [51] | Int. Cl. | A61b 5/04 |
| [50] | Field of Search | 128/2.06,<br>2.1; 330/69, 25, 85, 149; 328/151 |

[56] References Cited

UNITED STATES PATENTS

| 2,885,662 | 5/1959 | Hansen | 328/151 |
| 3,430,072 | 2/1969 | Stevens | 328/151 |
| 3,498,288 | 3/1970 | Max et al. | 128/2.1 |

Primary Examiner—William E. Kamm
Attorney—Andrus, Sceales, Starke & Sawall

ABSTRACT: The electrocardiographic signal and a DC noise level are applied to a first of two input terminals to a differential amplifier and the output of the differential amplifier supplies the electrocardiographic signal to an output terminal without the DC noise level. To offset the DC noise level, a feedback loop from the output terminal to the second input terminal of the differential amplifier includes a sample and hold circuit that first applies the output from the differential amplifier through a nulling amplifier to a capacitor and then applies the potential on the capacitor to the second input terminal of the differential amplifier.

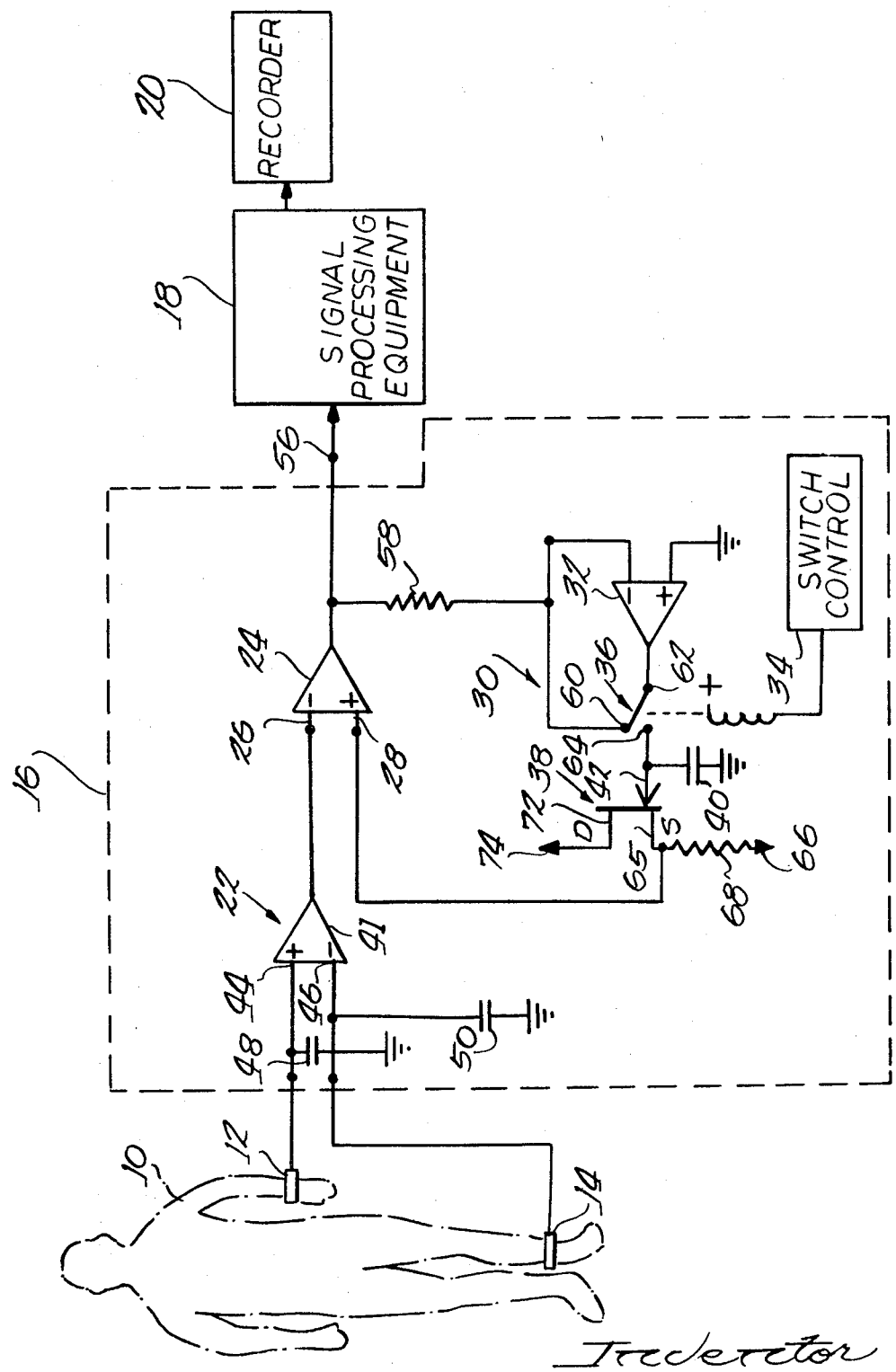

MEANS AND METHOD FOR SUBTRACTING DC NOISE FROM ELECTROCARDIOGRAPHIC SIGNALS

This invention relates to electrocardiographs and more particularly relates to input circuits that are especially useful as a part of such electrocardiographs.

In electrocardiography, electrodes that have been positioned on the skin of a subject receive electrical potentials generated by the subject and the currents created by these electrical potentials are conducted to an electrocardiograph for processing and recording of an electrocardiographic signal contained in the potentials or for presenting of the signal for viewing by an observer.

The electrocardiograph includes an input circuit that aids in the processing of these electrocardiographic signals.

To aid in the processing of the electrocardiographic signals, the input circuit removes unwanted noise from the signals, one type of which comprises a DC voltage level. The electrical potentials that are received by the electrodes include a DC voltage level that is generated by electrolytic action between the electrodes and chemicals that are present on the skin of the subject, some of which occur naturally in the skin and others of which are placed on the skin to reduce its electrical resistance. The input circuit of the electrocardiograph removes this DC voltage level and passes the electrocardiographic signal to further processing circuits in the electrocardiograph.

The prior art input circuits for electrocardiographs include capacitive coupling between the electrodes and the remainder of the circuits to block the DC voltage level and to pass the electrocardiographic signals. In these prior art input circuits, the capacitors that provide this capacitive coupling have a large capacity to permit the electrocardiographic signal to be passed. Capacitors having a large capacity are required because the electrocardiographic signals are of low frequency, falling approximately within the range of one-tenth of a hertz to 1000 hertz.

These prior art input circuits have a disadvantage in that the large capacity capacitors in them are large in size, heavy, and relatively expensive. The input circuits have a further disadvantage in that unless they are aided by special equipment they require a relatively long time such as, for example, up to a minute to charge the coupling capacitors. They have a still further disadvantage in that the capacitors block or greatly attenuate the low frequency components of the electrocardiographic signal.

Accordingly, it is an object of this invention to provide an improved input circuit for an electrocardiograph.

It is a further object of this invention to provide an input circuit for an electrocardiograph which input circuit is relatively small in size, light in weight, and inexpensive.

It is a still further object of this invention to provide an input circuit for an electrocardiograph that does not require a long period of time for its components to reach their operating condition after the components begin to receive input signals.

It is a still further purpose of this invention to provide an input circuit for an electrocardiograph which input circuit maintains a reference output voltage level close to ground potential.

It is a still further object of this invention to provide an input circuit for an electrocardiograph which input circuit has a frequency response to DC.

It is a still further object of this invention to provide a novel circuit for removing a DC voltage level from a time varying signal.

It is a still further object of this invention to provide an improved sample and hold circuit especially suitable for use in the input circuit of an electrocardiograph.

In accordance with the above and further objects of the invention an input circuit for an electrocardiograph is provided having a forward amplification path that includes a first differential amplifier and a feedback loop that includes a second differential amplifier. The first differential amplifier has first and second input terminals and an output terminal, the first input terminal of the first differential amplifier being electrically connected to receive the electrocardiographic input signals and the noise generated by the electrodes for the electrocardiograph and the output terminal of the first differential amplifier serving as the output terminal of the entire input circuit. The feedback loop includes a sample and hold circuit circuit having three components connected in series, which components are: (1) the second differential amplifier which receives an input signal on one of its input terminals from the output terminal of the input circuit and which serves as a nulling and comparator amplifier having a second of its input terminals grounded; (2) a switch; and (3) a field effect transistor. These three components are electrically connected in series in the order named from the output terminal of the first differential amplifier to the second input terminal of the first differential amplifier. The sample and hold circuit also includes a capacitor having one plate connected between the switch and the gate electrode of the field effect transistor and having its other plate grounded.

In the operation of the input circuit, the switch in the feedback loop is first closed to charge the capacitor and to null the first differential amplifier. The switch is then opened and the charge on the capacitor causes a potential to be offset against the input potential to the first differential amplifier to eliminate the DC voltage level from the electrocardiographic signal. The capacitor is charged through a low resistance so as to have a small RC time constant permitting it to be rapidly charged. After the switch is opened, the capacitor is discharged through the field effect transistor which has a high input resistance and therefore provides a large RC time constant that prevents the capacitor from discharging rapidly. When the switch is opened, the output terminal of the nulling amplifier is electrically connected to its input terminal to electrically disconnect the nulling amplifier from the feedback path leaving this path completely inoperative or open to a greater extent than would be the case if the nulling amplifier were providing output potentials to the switch.

Instead of relying upon AC coupling to block the DC voltage level, this input circuit utilizes a sample and hold circuit in a feedback loop for a differential amplifier to offset the DC voltage level and therefore does not require large capacitors such as those required for AC coupling of electrocardiographic signals. Since it does not include large capacity capacitors to couple the input circuit to the electrodes of the electrocardiograph, it does not require that signals be applied for a period of time necessary to charge the coupling capacitors before the remainder of the circuit becomes operative. Moreover, it has a frequency response down to DC.

Besides sampling and holding the potential received from the electrocardiograph electrodes, the sample and hold circuit nulls the first differential amplifier causing the output terminal of the input circuit to have a zero potential baseline with the electrocardiographic signal that is subsequently applied to it being referenced to the zero potential baseline. Moreover, during the sampling operation by the sample and hold circuit, the second differential amplifier serves as a comparator for a feedback loop that increases the precision of the storage of the DC voltage level on the capacitor of the sample and hold circuit. Since the nulling amplifier is a high gain amplifier, the output voltage of the first differential amplifier is held near ground level, or more precisely, at a voltage level that is approximately equal to the reciprocal of the nulling amplifier gain times the potential on the capacitor of the sample and hold circuit. Later the same differential amplifier subtracts the potential stored in the sample and hold circuit from the input potential and provides the output electrocardiographic signal without the DC voltage level.

The invention and the above noted and other features thereof will be better understood from the following detailed description when considered with reference to the accompanying drawing, which drawing is a simplified schematic circuit diagram of an electrocardiograph that includes an input circuit that is an embodiment of the invention.

GENERAL DESCRIPTION

In the drawing a subject 10 is shown having a first electrode 12 attached to one arm and a second electrode 14 attached to one leg. The skin underneath the electrodes 12 and 14 has any suitable substance placed upon it to reduce the electrical resistance of the skin in a manner known in the art.

The electrodes 12 and 14 receive electrical potentials generated by the subject 10. These potentials may be classified into two primary groups, which are: (1) the electrocardiographic signals that it is the purpose of the electrocardiograph to indicate and record; and, (2) a DC voltage level that is noise and must be removed from the electrocardiographic signals.

The electrical potentials received by the electrodes 12 and 14 are applied to the input circuit 16, which is an embodiment of the invention and, after the DC voltage level is removed from the electrocardiographic signals, the electrocardiographic signals are applied to suitable signal-processing circuitry 18, which circuitry will not be described herein in detail since it is not essential to the invention. After the electrocardiographic signals have been processed in the circuitry 18, they are transmitted to the recorder 20 for the preparation of an electrocardiogram. The recorder 20 is shown by way of example and other equipment such as telemetry equipment may receive the signal from the signal-processing equipment 18 for transmission to a remote station where it may be viewed or recorded.

The primary function of the input circuit 16 is to remove the DC voltage level from the electrocardiographic signal. The DC voltage level is generated by electrochemical activity between the electrodes 12 and 14 and the chemicals found naturally in the skin of the subject 10 or forming a part of a substance applied to the skin to lower its electrical resistance. The DC voltage level is relatively high, being as high as 100 millivolts in amplitude under some situations, while the electrocardiographic signal is typically 1 millivolt in amplitude.

The input circuit 16 includes a first amplifier stage 22, a differential amplifier 24 having a first input terminal 26, a second input terminal 28, and a feedback loop 30. The input amplification stage 22 filters the input currents to remove externally created noise from the electrocardiographic signal and amplifies the electrocardiographic signal and the DC voltage level. The amplified DC voltage level and electrocardiographic signal are conducted to the first input terminal 26 of the differential amplifier 24 from the output terminal of the first amplification stage 22. The feedback loop 30 includes a sample and hold circuit and a switch control 34 which may be a manual pushbutton, a level detector, timer or any other suitable apparatus for controlling the sample and hold circuit.

The sample and hold circuit comprises three components in series from the output of the differential amplifier 24 to its second input terminal 28 in the order named, which components are (1) a differential amplifier 32 that serves as a nulling and comparator amplifier; (2) a switch 36; and (3) a field effect transistor 38. The sample and hold circuit also includes a capacitor 40 which has one plate connected between the gate electrode 42 of the field effect transistor 38 and a stationary contact 64 of the switch 36 and has its other plate grounded.

In the operation of the input circuit 16, the switch 36 is first closed to the stationary contact 64 to connect the output of the differential amplifier 32 to one plate of the capacitor 40 and to the gate electrode 42 of the field effect transistor 38. With the switch 36 closed, the feedback circuit 30 nulls the differential amplifier 24, charging the capacitor 40 to a potential that causes the amplitude of the potential applied to the second input terminal 28 to be equal to the amplitude of the potential applied to the first input terminal 26 of the differential amplifier 24.

After the differential amplifier 24 has been nulled, the switch 36 is opened. The input electrocardiographic signal and DC voltage level applied to the input terminal 26 of the differential amplifier 24 are now balanced against the potential applied to the second input terminal 28 of the differential amplifier 24, which potential originates with the charge stored in the capacitor 40. The resulting output from the differential amplifier 24 is the time varying electrocardiographic signal, the DC voltage level having been offset by the input potential applied to the terminal 26 which potential originated with the charge stored on the capacitor 40. This output is applied to the signal processing equipment 18.

SPECIFIC DESCRIPTION OF THE INPUT CIRCUIT

The first amplifier stage 22 of the input circuit 16 includes a differential amplifier 41 having a first input terminal 44 and a second input terminal 46. The first input terminal 44 is electrically connected to the electrode 12 on the subject 10 and the second input terminal 46 is electrically connected to the electrode 14 on the subject 10. To aid in filtering the externally generated noise from the electrocardiographic signal, a filter network is connected to the input of the first amplifier stage 22. In this filter network, a first 470 picofarad capacitor 48 is connected between the first input terminal 44 and ground and a second 470 picofarad capacitor 50 is connected between the input terminal 46 and ground. Other filter networks may be included where needed in the circuit to filter externally generated noise from the electrocardiographic signal.

Although two electrodes 12 and 14 are shown in the drawings several more are used in some systems and a switching network is incorporated in the circuit to selectively couple the electrodes to the inputs of the first amplifier stage. Further, conventional buffers, such as emitter follower amplifiers, precede the differential amplifier 41 in the circuit to increase its input impedance in a manner known in the art.

The differential amplifier 41 may be of any suitable type such as the amplifier sold under the designation LM 201 Operational Amplifier by National Semiconductor Corporation connected to operate as a differential amplifier.

The output voltage from the differential amplifier 41 is applied to the first input terminal 26 of the differential amplifier 24. The output of the differential amplifier 24 is applied to the output terminal 56 of the input circuit 16 which output terminal 56 is electrically connected to the signal-processing equipment 18. The differential amplifier 24 may also be a type LM 201 operational amplifier manufactured by National Semiconductor Corporation. Each of the amplifiers 41 and 24 have a gain of 31.6 and together provide a gain of 1000 for the electrocardiographic signal.

The output from the differential amplifier 24, besides being applied to the output terminal 56, is also applied to one side of the 10K resistor 58 of the feedback circuit 30. The other side of the 10K resistor 58 is connected to the stationary contact 60 of the single pole double throw switch 36 and to the inverting input terminal of the nulling and comparator amplifier 32. The output from the nulling amplifier 32 is connected to the common moving contact 62 of the single pole, double pole switch 36. Although a relay operated switch is disclosed specifically herein, many other types of mechanical, electromechanical or electronic switches can be used instead. The nulling amplifier 32 may be the same type of operational amplifier, connected as a differential amplifier, as the operational amplifier 41. Its noninverting input terminal is grounded.

A stationary contact 64 of the single pole, double throw switch 36 is electrically connected to one plate of the 0.068 microfarad capacitor 40 and to the gate electrode 42 of the 2N4340 field effect transistor 38. The source electrode 65 of the field effect transistor 38 is connected to a source 66 of a negative 6 volts DC through a 10K resistor 68 and is connected to the second input terminal 28 of the differential amplifier 24. The drain electrode 72 of the field effect transistor 38 is electrically connected to a source 74 of a positive 6 volts DC.

In conventional electrocardiographic equipment the recorder 20 is a single channel recorder. The electrodes 12 and 14, the input circuit 16 and the signal-processing equipment 18 provide the electrocardiographic signal to be recorded in one channel. However, the input circuit 16 and the signal-processing equipment 18 provide the electrocardiographic signal to be recorded in one channel. However, the input circuit 16 is suitable for use in other arrangements of electrocardiographic systems such as three channel recorders and telemetry systems in which electrocardiographic signals from a plurality of sources are transmitted to a central console for processing.

OPERATION OF THE INPUT CIRCUIT

Before recording the electrocardiographic signal, the differential amplifier 24 is nulled by the feedback loop 30. To this end, the double throw single pole switch 36 is closed to connect the common contact 62 to the stationary contact 64.

With the switch 36 closed to the contact 64, the feedback circuit 30 is closed between the output terminal 56 and the second input terminal 28 of the differential amplifier 24. In this feedback circuit, the input signal to the first input terminal 26 of the differential amplifier 24 is inverted and applied to the input terminal of the nulling amplifier 32. The signal is again inverted by the nulling amplifier 32 and conducted through the switch 36 from the common contact 62 and the stationary contact 64 to the capacitor 40 and the gate electrode 42 of the field effect transistor 38.

This signal rapidly charges the capacitor 40. The capacitor charges rapidly because the output impedance of the nulling amplifier 32 is approximately 10 ohms providing a short time constant together with the 0.068 microfarad capacitor 40. Besides charging the capacitor 40, the signal gates the field effect transistor 38, the output voltage of which is applied to the second input terminal 28 of the differential amplifier 24, which is a noninverting terminal. The field effect transistor 38 acts as a source follower in this circuit to amplify the signal applied to its gate electrode 42.

When the charge on the capacitor 40 is sufficient so that the field effect transistor 38 applies a voltage to the second input terminal 28 that is equal in amplitude to the voltage being received by the first input terminal 26 of the differential amplifier 24, the output from the amplifier 24 is nulled. The output terminal 56 of both the differential amplifier 24 and of the input circuit 16 is held near a ground potential reference level because of the high gain of the nulling amplifier 32, which compares the signal on output terminal 56 to ground. The feedback loop operates to reduce the signal on output terminal 56 to substantially ground level. The potential at the terminal 56 is substantially equal to the potential on capacitor 40 multiplied by the reciprocal of the gain of the nulling amplifier 32. The potential that is held on the capacitor 40 is controlled with precision by the feedback loop formed for the sample and hold circuit 30 during the sampling operation with the switch 36 closed to the pole 64, which feedback loop includes the differential amplifier 32. The amplifier 24 serves as a comparator for this feedback loop during the sampling operation.

After the output of the differential amplifier 24 has been nulled, the switch 36 is opened to measure the electrocardiographic signal. When the switch is opened, the contact 62 is connected to the stationary contact 60 of this switch to electrically disconnect the amplifier 32 from the feedback loop.

The feedback loop is opened when the switch 36 is opened and the capacitor 40 slowly discharges through the field effect transistor 38. The capacitor discharges slowly because the input impedance of the field effect transistor is approximately $10^9$ ohms resulting in a high time constant for the discharge path. The voltage resulting from the charge stored in the capacitor 40 controls the gate electrode 42 of the field effect transistor 38 to provide an input voltage to the second input terminal 28 of the differential amplifier 24 which input voltage is equal to the DC voltage level. The output of the differential amplifier 24 is now a replica of the time varying component of the signal applied to the first input terminal 26 referenced to ground, which replica represents the electrocardiographic signal.

It has been discovered that it is not sufficient for good results to merely open the switch 36 when the feedback loop 30 is to be opened to take a reading of the electrocardiographic signal but that the differential amplifier 32 must be electrically disconnected. In the embodiment described herein this is accomplished by electrically connecting the output of the amplifier 32 to its input when the switch 36 is opened.

The reason that the amplifier must be electrically disconnected is that a small current may be transmitted from the output of the amplifier 32 to the gate electrode 42 of the field effect transistor 38 even with the switch 36 open and, because of the high gain of the differential amplifiers 24 and 32, provide a feedback voltage to the input terminal 28 of the differential amplifier 24 that varies with the input electrocardiographic signal on the input terminal 26 of the differential amplifier 24 rather than being the voltage derived from the charge stored in capacitor 40 while the switch 36 was closed. If this were permitted because the amplifier 32 was not electrically disconnected, the output at terminal 56 would not be the desired electrocardiographic signal and, indeed, if the feedback loop gain with the switch 36 open were unity, the electrocardiographic signal would be completely offset by the feedback voltage resulting in no output signal to terminal 56.

One cause of the current being conducted to the gate electrode 42 while the switch 36 is opened is that a potential divider is formed with one branch being the capacitor 40 and the other branch being the capacitance of the relay operated switch 36 and this potential divider receives a potential that varies in proportion to the output of the amplifier 32, but the current may also arise from other conditions in slightly different circuit arrangements. However, this problem is solved by electrically disconnecting the amplifier 32.

It can be understood that the input circuit of this invention has several advantages over prior art input circuits. Firstly, the DC voltage level is removed from the input to the electrocardiograph by the input circuit described herein without the use of AC coupling. The circuit for accomplishing the removal of the DC voltage level does not require the large coupling capacitors that are characteristic of the AC coupling for the relatively low frequency electrocardiographic signals and therefore can be smaller, lighter and less expensive. Secondly, the input circuit of this invention requires less time for transient potentials to become negligible in the input circuit than the time that is required for transient potentials to become negligible in a circuit using AC coupling. The time is reduced because the amplifiers of the input circuit described herein are directly coupled to the electrodes of the electrocardiograph and the current from the electrodes does not have to charge the relatively large capacitors used to provide the AC coupling. Thirdly, the reference output potential of the input circuit is maintained near ground potential with precision by the feedback loop. Fourthly, the circuit configuration is economical. Fifthly, the input circuit has a frequency response to DC.

Although an embodiment of the invention has been described with some particularity, it is to be understood that many modifications and variations of the invention may be made in the light of the above teachings. It is therefore to be understood that, within the scope of the appended claims, the invention may be practiced otherwise than as specifically described.

I claim:

1. A method of obtaining an indication of an electrocardiographic signal comprising the steps of:
    attaching electrodes to a subject for the generation of electrical potentials including a DC voltage level having a time varying electrocardiographic signal component imposed thereon;
    receiving a first potential from said electrodes during a first period of time;

comparing said first potential with a ground reference and deriving an output signal representative of the DC voltage level of said first potential with respect to ground;

storing said output signal during said first period of time;

receiving a second potential from said electrodes during a second period of time;

subtracting from said second potential received during said second period of time said stored output signal to obtain the time varying component of said potential with respect to ground received during said second period of time; and applying said time varying component of said potential to electrical-indicating equipment to obtain an indication of said electrocardiographic signal.

2. The method of claim 1 in which the step of storing said output signal includes the steps of applying the output signal to one plate of a capacitor until said capacitor is charged to a potential equal to that of the DC voltage level with respect to ground and removing the output signal from said plate of said capacitor after the signal stored on said capacitor is equal to the DC voltage level.

3. The method of claim 1 in which:

the steps of receiving and comparing said first potential and of storing said output signal include the steps of electrically connecting at least one input terminal of a differential amplifier to said electrodes, applying the output of said differential amplifier to the input of a comparator amplifier, and applying the output signal of the comparator amplifier to one plate of a capacitor having the second plate thereof grounded for charging the capacitor; and the step of subtracting the stored signal from said second potential comprising the steps of removing the output signal of said comparator amplifier from said one plate of said capacitor, and biasing the gate electrode of a field effect transistor connected in source follower configuration to the second input of said differential amplifier with the charge of the capacitor, whereby the output potential of said differential amplifier provides an indication of said electrocardiographic signal component.

4. An electrocardiograph input circuit having an input terminal adapted to receive an input potential signal comprised of an electrocardiographic signal and a DC voltage level and having an output terminal providing an electrocardiographic signal referenced to ground, comprising:

a differential amplifier (24) responsive to first and second input signals applied to first (26) and second (28) input terminals for providing a corresponding output signal at an output terminal, said first input terminal being connected to the input terminal of said electrocardiograph input circuit and said output terminal being connected to the output terminal (56) of the electrocardiograph input circuit;

a high gain comparator amplifier (32) for comparing signals applied to a pair of input terminals, one of said input terminals being connected to the output terminal of said differential amplifier for receiving the input potential signal, the other of said input terminals being connected to ground, said amplifier providing a ground referenced comparative output signal at an output terminal thereof;

a switch (36) having a first terminal electrically connected to the output terminal of said comparator amplifier (32) and a second terminal adapted to be connected to said first terminal when said switch is closed, said switch being periodically operable into a low resistance closed state during a first period of time and into a substantially infinite resistance open state during a second period of time;

means for storing a potential representative of the difference between said input potential signal and a ground reference comprising a capacitor (40) having one plate electrically connected to said second terminal of the switch for receiving said comparative output signal when said switch is closed, said capacitor having its other plate grounded; and a field effect transistor (38) having a gate electrode connected to said second terminal of said switch, a drain electrode connected to a bias means, and a source electrode connected to said second input terminal of said differential amplifier for establishing the output of the differential amplifier at a ground potential reference during said first period of time by applying the comparative output signal of said comparator amplifier and for subtracting said stored potential from said input potential signal received on said circuit input terminal during said second period of time for providing said ground referenced electrocardiographic signal at the circuit output terminal.

5. An input circuit for an electrocardiograph in accordance with claim 4 and further including a means for electrically disconnecting said comparator amplifier when said switch is opened.

6. An input circuit for an electrocardiograph in accordance with claim 5 in which:

said means for electrically disconnecting said comparator amplifier includes a third terminal for said switch adapted to be connected to said first terminal when said switch is opened;

said third terminal of said switch being electrically connected to said input terminal of said comparator amplifier.